US008144686B2

(12) United States Patent
Sahni et al.

(10) Patent No.: US 8,144,686 B2
(45) Date of Patent: Mar. 27, 2012

(54) METHOD AND SYSTEMS FOR BANDWIDTH SCHEDULING AND PATH COMPUTATION FOR CONNECTION-ORIENTED NETWORKS

(75) Inventors: Sartaj Sahni, Gainesville, FL (US);
Nageswara Sirikonda Venkata Rao, Powell, TN (US); Sanjay Ranka, Gainesville, FL (US); Yan Li, Gainesville, FL (US); Eun-Sung Jung, Gainesville, FL (US); Narayana Kamath, Herndon, VA (US)

(73) Assignees: University of Florida Research Foundation, Inc., Gainesville, FL (US); UT-Battelle, LLC, Oak Ridge, TN (US)

( * ) Notice: Subject to any disclaimer, the term of this patent is extended or adjusted under 35 U.S.C. 154(b) by 813 days.

(21) Appl. No.: 11/738,464

(22) Filed: Apr. 20, 2007

(65) Prior Publication Data
US 2008/0259954 A1 Oct. 23, 2008

(51) Int. Cl.
*H04L 12/28* (2006.01)

(52) U.S. Cl. .................................. 370/351; 370/395.21

(58) Field of Classification Search .................. 370/235, 370/229, 231, 237, 351, 232, 389, 395.21, 370/395.4, 400; 709/220, 227, 228, 229, 709/250
See application file for complete search history.

(56) References Cited

U.S. PATENT DOCUMENTS 7,450,513 B2 * 11/2008 Okamura et al. ............. 370/235
2005/0128951 A1 * 6/2005 Chawla et al. ................ 370/235
* cited by examiner

*Primary Examiner* — Brenda H Pham
(74) *Attorney, Agent, or Firm* — MH2 Technology Law Group LLP

(57) ABSTRACT

A connection-oriented network includes a control server. The control server receives requests to establish and utilize dedicated channels in the network. The control server utilizes various scheduling methods and algorithms to determine channels based on the request's requirements and resources of the network. For example, the control server may determine a channel based on: (i) a specified bandwidth in a specified time slot, (ii) highest available bandwidth in a specified time slot, (iii) earliest available time with a specified bandwidth and duration, and (iv) all available time slots with a specified bandwidth and duration.

21 Claims, 9 Drawing Sheets

User Bandwidth Reservation

User name: [          ]

Source switch:
```
E300_OANL
E300_CHI
E300_SEA
E300_SUN
```

Source user port:
```
E300_OANL_1G_0
E300_OANL_1G_1
E300_OANL_1G_2
E300_OANL_1G_3
```
Note: hold Ctrl (Windows) or Shift (Mac) to choose multiple interfaces.

Destination switch:
```
E300_OANL
E300_CHI
E300_SEA
E300_SUN
```

Destination user port:
```
E300_OANL_1G_0
E300_OANL_1G_1
E300_OANL_1G_2
E300_OANL_1G_3
```
Note: hold Ctrl (Windows) or Shift (Mac) to choose multiple interfaces.

Bandwidth to be Reserved: [100.0] Mbps

Check this option to reserve the requested bandwidth during a specific time slot:

○ Reservation start time: [2005▼] yr. [▼] mo. [▼] day [▼] hr. [▼] min [▼] sec

Reservation end time: [2005▼] yr. [▼] mo. [▼] day [▼] hr. [▼] min [▼] sec

Check this option to list all available start times for the requested bandwidth and duration:

○ Reservation duration: [0] hours [0] minutes [0] seconds

[Submit]

FIG. 3

METHOD AND SYSTEMS FOR BANDWIDTH SCHEDULING AND PATH COMPUTATION FOR CONNECTION-ORIENTED NETWORKS

GOVERNMENT INTEREST

This invention was made with government support under NSF Grant No. CCR9912395. The United States Government has certain rights in the invention.

FIELD

This invention is generally related to network systems.

BACKGROUND

A number of large-scale science and commercial applications produce large amounts of data, on the order of terabytes to petabytes, that must be transported across wide-area networks. For example, large simulation data sets produced by science application, such as eScience application on supercomputers, may be archived at a remote storage site, or bank transaction records or inventories of large department stores may be synchronized with remote storage during off-peak hours.

When data providers and consumers are geographically distributed, dedicated connections are needed to effectively support a variety of remote tasks including data mining, data consolidation and alignment, storage, visualization and analysis. The dedicated bandwidth channels offer large capacity for massive data transfer operations and dynamically stable bandwidth for monitoring and steering operations. It is important that these channels be available when the data is or will be ready to be transferred at a particular time. Thus, the ability to reserve such dedicated bandwidth channels either on-demand or in-advance is critical to both data transfer operations.

SUMMARY

An embodiment of the present disclosure is directed to a system for controlling access to a network. The system comprises an input for receiving a request to establish a dedicated channel in a network. The request comprises at least one of a bandwidth for the channel and duration of the channel. The system further comprises a bandwidth scheduler coupled to the input for determining a path of the channel across the network based request and resources of the network, and a signaling daemon for generating a control signals based the determined path.

Another embodiment of the present disclosure is directed a method for transferring data. The method comprises receiving a request to establish a dedicated channel in a network. The request comprises at least one of a bandwidth for the channel, a start time for the channel, and a duration of the channel. The method further comprises determining a path of the channel across the network based on the request and resources of the network, and scheduling the channel based on the determination.

Another embodiment of the present disclosure is directed to a computer. The computer comprises a processor and an input coupled to the processor. The input receives a request to establish a dedicated channel in a network. The request comprises at least one of a bandwidth for the channel, a start time for the channel, and a duration of the channel. The computer further comprises a memory coupled to the processor and input. The memory contains instructions for causing the processor to determine a path of the channel across the network based on the request and resources of the network, and schedule the channel based on the determination.

Additional embodiments of the disclosure will be set forth in part in the description which follows, and in part will be obvious from the description, or may be learned by practice of the present disclosure. The embodiments of the disclosure will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the disclosure and together with the description, serve to explain the principles of the embodiments.

FIG. 3 is a generalized diagram of a request interface consistent with embodiments of the present disclosure.

DETAILED DESCRIPTION

According to embodiments of the present disclosure, systems and methods are directed to determining and scheduling dedicated channels in a connection-oriented network. The connection-oriented network includes a control server. The control server receives requests to establish and utilize dedicated channels in the network. The control server utilizes various scheduling methods and algorithms to determine channels based on the request's requirements and resources of the network. For example, the control server may determine a channel based on: (i) a specified bandwidth in a specified time slot, (ii) highest available bandwidth in a specified time slot, (iii) earliest available time with a specified bandwidth and duration, and (iv) all available time slots with a specified bandwidth and duration.

Reference will now be made in detail to the exemplary embodiments of the present disclosure, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments which may be practiced. These embodiments are described in sufficient detail to enable those skilled in the art to practice the embodiments and it is to be understood that other embodiments may be utilized and that changes may be made without departing from the scope of the invention. The following description is, therefore, merely exemplary.

Figure 1:
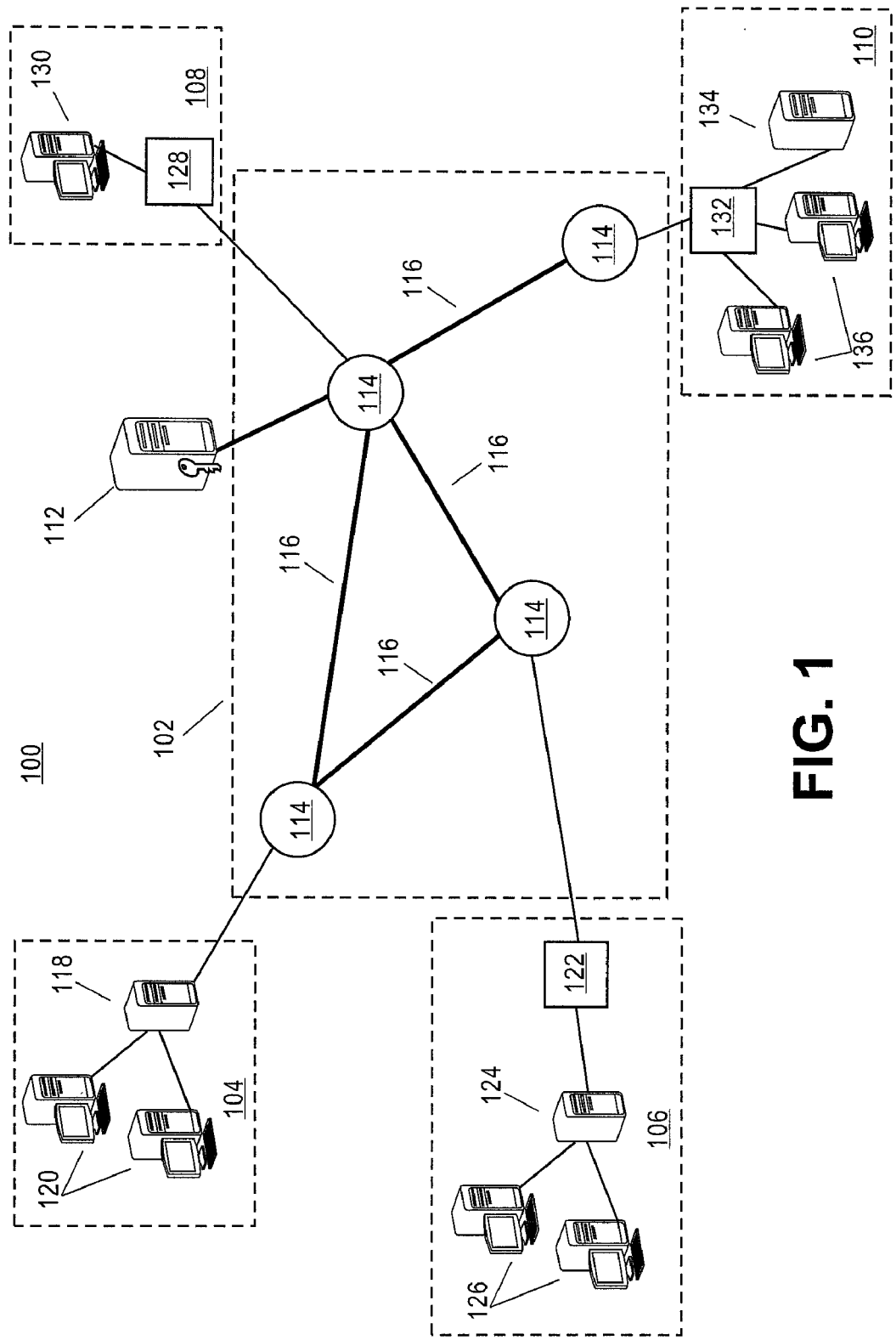
FIG. 1 is a generalized diagram of a network consistent with embodiments of the present disclosure.

FIG. 1 is a generalized diagram illustrating a connection-oriented network 100. Network 100 includes network backbone 102, sub-networks 104, 106, 108 and 110, and control server 112. It should be readily apparent to those of ordinary skill in the art that network 100 illustrated in FIG. 1 represents a generalized diagram and that other components may be added or existing components may be removed or modified.

Network backbone 102 provides high speed and large bandwidth for data transfers over geographical distances. Network backbone 102 may provide dedicated channels for data transfer to systems and users located in sub-networks 104, 106, 108, and 110 coupled to network backbone 102.

Network backbone 102 includes core switches 114 and data lines 116. Core switches allow dedicated channels to be established through network backbone 102. Core switches 114 may be geographically distributed with data lines 116 connecting core switches 114 over the geographic distances. Core switches 114 may be any type of well-known hardware, software, and combination thereof to interconnect data lines 116 and to control the flow of data at layer 1 or "physical layer" in an OSI network hierarchy of data lines 116. For example, core switches 114 may be a multiplexing switch, add/drop cross connect switch, and the like.

Data lines 116 may be any type of physical connection, such as electrical wires, optical fiber and the like, wireless connection, and combinations thereof to transfer data over geographic distances. For example, data lines 116 may be optical fibers with core switches 114 utilizing synchronous optical networking ("SONET") to control data in network backbone 102.

Sub-networks 104, 106, 108, and 110 may be connected to network backbone 102 in any suitable manner to allow a requester in the sub-networks to request, access, and utilize a dedicated channel of network backbone 102. One skilled in the art will realize that any number of sub-networks or devices may be connected to network backbone 102.

Sub-network 104 may include a server 118 and clients 120. Server 118 may be coupled to one of core switches 114. Server 118 may include a network interface card that directly communicates with core switch 114. Server 118 may provide further network resolution to clients 120. For example, server 118 may provide layer 2 and layer 3 network services in an open system interconnection ("OSI") network hierarchy to clients 120 to allow clients 120 to request, access, and utilize dedicated channels in network backbone 102.

Sub-network 106 may include a network switch 122, a server 124, and clients 126. Network switch 122 may be coupled to one of core switches 114. Network switch 122 may be any type of hardware, software, or combination thereof to support network protocols at layer 2 and layer 3 to allow a connection to network backbone 102. For example, network switch 122 may be an Ethernet switch and the like. Network switch 122 may be coupled to one of core switches 114.

Server 124 may be coupled to network switch 122. Server 124 may provide further network resolution to clients 126. For example, server 124 may provide additional layer 2 and layer 3 network services to clients 126 to allow clients 126 to request, access, and utilize dedicated channels in network backbone 102.

Sub-network 108 may include a provisioning platform 128 and a server 130. Provisioning platform 128 may be coupled to one of core switches 114. Provisioning platform 128 may be any type of hardware, software, or combination thereof to support network protocols at layer 2 to allow connection to network backbone 102.

Sub-network 110 may include a router 132, a server 134, and one or more clients 136. Router 132 may be coupled to one of core switches 114. Router 132 may be any type of network hardware, software, or combination thereof to receive and forward data from server 134 and clients 136 onto network backbone 102.

In the above sub-network, servers 118, 124 and 134, and clients 120, 126, 130 and 136 may be implemented using a variety of devices, software, and combinations thereof. For example, the clients and servers may be implemented on a personal computer, workstation, terminal, and the like. In addition, the clients and servers may run under an operating system, such as the LINUX operating system, the MICROSOFT WINDOWS operating system, and the like. The clients and servers may also operate network applications for supporting communicating with networks and transferring data, such as web browsers and servers, file clients and hosts, ftp client and hosts, and the like.

One skilled in the art will also recognize that servers 118, 124 and 134, and clients 120, 126, 130 and 136 may be implemented with various peripheral devices, such as a display, one or more speakers, and other suitable devices. Servers 118, 124 and 134, and clients 120, clients 126, client 130 and client 136 may also be implemented with various peripherals for accepting input from a user, such as a keyboard, a mouse, and the like.

Although FIG. 1 shows several sub-networks, one skilled in the art will realize that network 100 may include any number of sub-networks. Further, one skilled in the art will realize that the sub-networks may also be additional or fewer network hardware, such as switches and routers, servers, and clients.

Network backbone 102 provides high speed and large bandwidth for data transfers over geographical distances. Network backbone 102 provides dedicated channels for data transfer to requesters located in sub-networks 104, 106, 108, and 110 coupled to network backbone 102. Any of the clients and servers may become a requester to request, access, and utilize the dedicated channels. In order to utilize the dedicated channels, any requester can request a dedicated channel from control server 112.

Control server 112 may be a separate and stand-alone computer system capable of determining and allocating dedicated channels in network backbone 102. Control server 112 may be coupled to any one of core switches 114. Control server 112 may receive requests for dedicated channels in network backbone 102 from sub-networks 104, 106, 108, and 110. Alternatively, the functions of control server 112 may be performed by any one of servers 118, 124, and 134. Further, any of control server 112 and servers 118, 124, and 134 may function cooperatively to determine dedicated channels.

Control server 112 may include any necessary hardware, software, and combination thereof to receive requests for use of dedicated channels from sub-networks 104, 106, 108, and 110. Control server 112 may include any necessary hardware, software, and combination thereof to determine the channel allocations on network backbone 102. Control server 112 may include any necessary hardware, software, and combinations thereof to generate configuration signals for core switches 114 to establish and destroy the dedicated channels.

Since control server 112 controls all access to network backbone 102, control server 112 may only process requests from authorized requesters, such as servers and clients. Control server 112 may employ any type of well-known secure authorization system, such as secure login, digital signatures, cryptographic verification, and the like to establish the authenticity of a requestor.

Additionally, the data connection from requesters to control server 112 may also be secure to prevent interception and tampering with dedicated channel requests. For example, the data connection from requestors to control server 112 may be a secure connection, such as virtual private network ("VPN"), virtual local area network ("VLAN") and the like. In the secure connection, the data transmitted to and received from control server 112 may be secured by any well-known cryptographic techniques, such as symmetric cryptography, asymmetric cryptography, digital signature, and the like.

Figure 2:
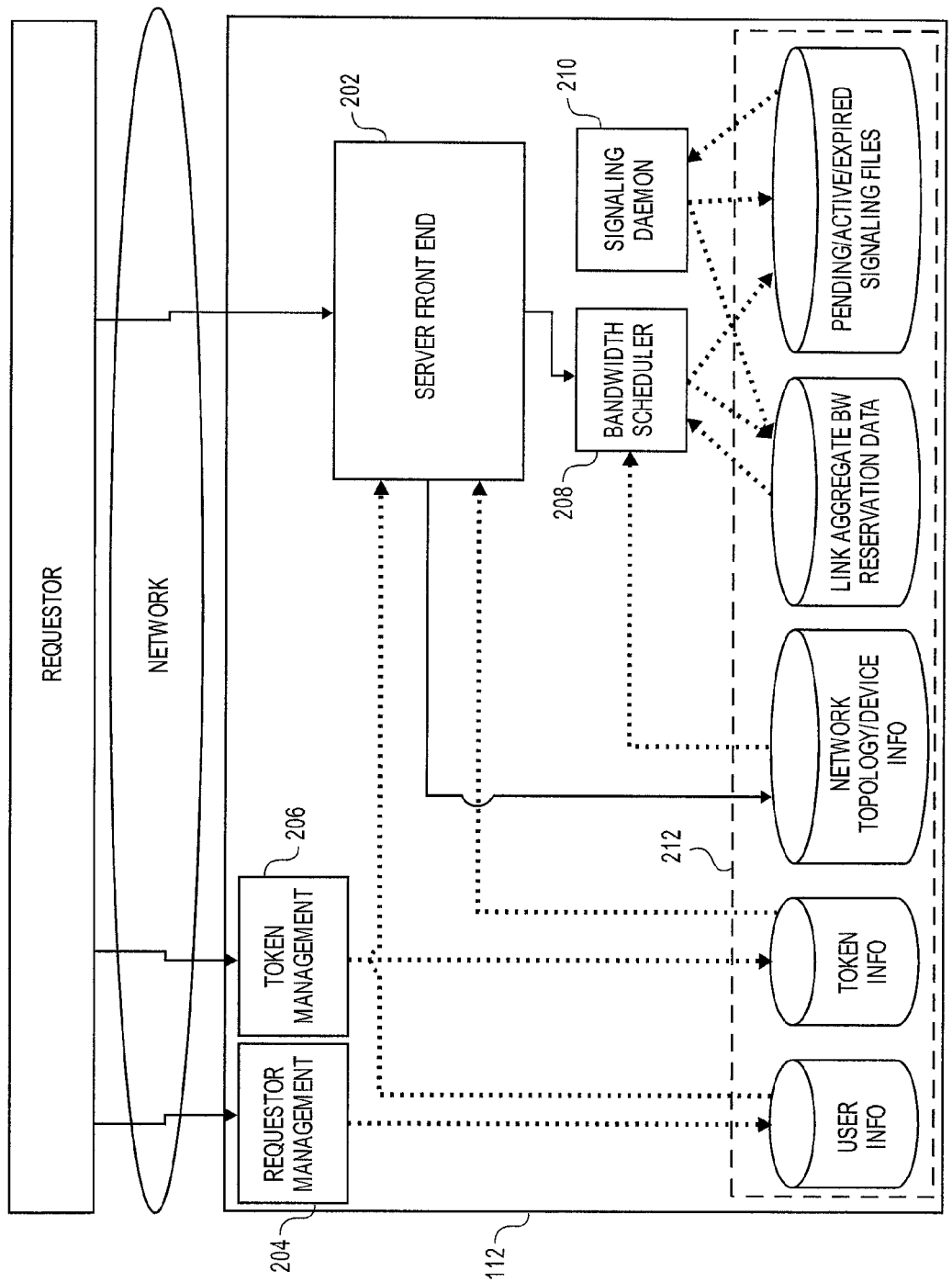
FIG. 2 is a generalized diagram of a control server consistent with embodiments of the present disclosure.

FIG. 2 is a generalized diagram illustrating an exemplary control server 112 consistent with embodiments of the present disclosure. Control server 112 includes a server front end 202, requestor management unit 204, token management unit 206, bandwidth scheduler 208, signaling daemon 210, and database 212. It should be readily apparent to those of ordinary skill in the art that control server 112 illustrated in FIG. 2 represents a generalized diagram and that other components may be added or existing components may be removed or modified.

Server front end 202 provides an interface for requesters, for example clients and servers, to request and reserve a dedicated channel on network backbone 102. Server front end 202 may be implemented in hardware, software, and combinations thereof. For example, server front end 202 may be a web server for providing web services to the requesters, such as clients and servers. The web services provide a web-based interface for the requester to request and reserve a channel on network backbone 102.

The request received by control server 112 may include identity information of the requestor and different information about the requirements for the channel. The identity information may include a login name and password. The requirements information may include the location of the client or host, the destination of the data, the bandwidth requested, and the time period for the channel.

FIG. 3 is a diagram illustrating an exemplary interface 300 for receiving requests from the requester. As illustrated, interface 300 may include different fields for a requester to enter information about a dedicated channel. Interface 300 may be implemented as a network interface, such as a graphic user interface.

Returning to FIG. 2, server front end 202 may also provide an interface for administrators of control server 112 to add and modify information about the structure of network 100. For example, server front end 202 may be a web server for providing web services to the administrators. The interface provides a web-based interface for the requestor to add and remove devices of network 100. Additionally, the interface may allow administrator to add information about network 100, such as bandwidth of the links. Server front end 202 may be coupled to database 212. As such, server front end 202 may store information about the structure of network 100 in database 212.

Requestor management unit 204 provides an interface for registering requestors, such as clients and servers, allowed to request and reserve a channel on network backbone 102. Requestor management unit 204 may register clients and servers as requestors by receiving identity information from the clients and servers. Requestor management unit 204 verifies the information provided by the clients and servers.

Requestor management unit 204 may be coupled to database 212. Once the requestor is verified, the identity information may be stored in database 212. Server front end 202 may retrieve the identity information from database 212 in order to authenticate the requestors requesting and reserving channels on network backbone 102.

Token management unit 206 may provide further authentication and access control if control server 112 requires a secure connection in order to request a channel. For example, token management unit 206 may control the authentication and access control if control server 112 utilizes a secure connection such as VPN or VLAN.

Bandwidth scheduler 208 receives the authenticated request from server front end 202. Bandwidth scheduler 208 determines and schedules an available channel based on the requirements of the request. Bandwidth scheduler 208 may allocate the available bandwidth to the dedicated channels in time and space. Bandwidth scheduler 208 may determine the dedicated channel based on two types of requests and based on the current availability of bandwidth:

(a) On-demand request—a connection request for an immediate dedicated channel. Bandwidth scheduler 208 may accept or deny the request depending on the current bandwidth availability; and (b) In-advance request—a connection request for future dedicated channels. Bandwidth scheduler 208 may determine and allocate the dedicated channel based on bandwidth allocation schedules.

Bandwidth scheduler 208 may be coupled to database 212. Bandwidth scheduler may retrieve data from database 212 about network 100 and the requestor. For example, bandwidth scheduler 208 may retrieve information such as the structure and devices in network 100 and the sub-networks, current channels and bandwidth usage on network 100, future scheduled dedicated channels, location and identity of the requester, and the like.

According to embodiments of the present disclosure, in order to determine a channel's availability, bandwidth scheduler 208 may utilize various scheduling methods and algorithms depending on the request. Bandwidth scheduler 208 determines a channel by receiving the source and destination of the channel. The source may be location in the network of the requestor. The destination may be the ending point in the network of the channel (i.e. the location in the network were the requester may transmit data). Bandwidth scheduler 208 may determine a channel by determining a path or slot across network 100 based on the request requirements and the resources of network 100. The path may be the different devices, such as switches, routers, computers and the like, and data links through which the channel would be established.

For example, a dedicated channel from a given source to a given destination based on the request requirements and one or more of: (i) a specified bandwidth in a specified time slot, (ii) highest available bandwidth in a specified time slot, (iii) earliest available time with a specified bandwidth and duration, and (iv) all available time slots with a specified bandwidth and duration.

Once a dedicated channel is determined, bandwidth scheduler 208 may generate the appropriate scripts to implement the dedicated channel over network 100. Bandwidth scheduler 208 may store the scripts in database 212.

Once a dedicated channel has been determined, signaling daemon 210 may invokes appropriate scripts to set up or tear down the channels in the network for the determined channel. Signaling daemon 210 may be coupled to database 212. Signaling daemon 210 may retrieve the scripts from database 212. Signaling daemon 210 may transmit the scripts to the components of network 100, such as core switches 114.

Database 212 may maintain information regarding the structure of network 100, the identity of clients and servers in network 100, the determined channels in network 100, the available bandwidth, and the like.

Control server 112 may be implemented using a variety of devices, software, and combinations thereof. For example, control server 112 may be implemented one or more computing platforms, such as personal computer, workstation, terminal, and the like. Control server 112 may include the standard components of a computing platform such as a processor, memories, busses, input/output ports, network interface cards, and the like.

In addition, control server 112 may run under an operating system, such as the LINUX operating system, the MICROSOFT WINDOWS operating system, and the like. The various components, such as server front end 202, requester management unit 204, token management unit 206, bandwidth scheduler 208, and signaling daemon 210, of control server 112 may be implemented as software applications stored in memory in control server 112 and executed by the processor of control server 112. The software applications may be written in a variety of programming languages, such as C, C++, Java, etc. Database 212 may be implemented using well known database technology, such as relational databases, or object oriented databases.

Control server 112 also may be implemented with various peripheral devices, such as a display, one or more speakers, and other suitable devices. Control server 112 may also be implemented with various peripherals for accepting input from a user, such as a keyboard, a mouse, and the like.

While FIG. 2 illustrates a single system performing the functions of control 112, one skilled in the art will realize that multiple control servers 112 may cooperatively operate together to perform the functions of control server 112. Further, one skilled in the art will realize that the component of 112 may be embodied one than one computing platform.

Figure 4:
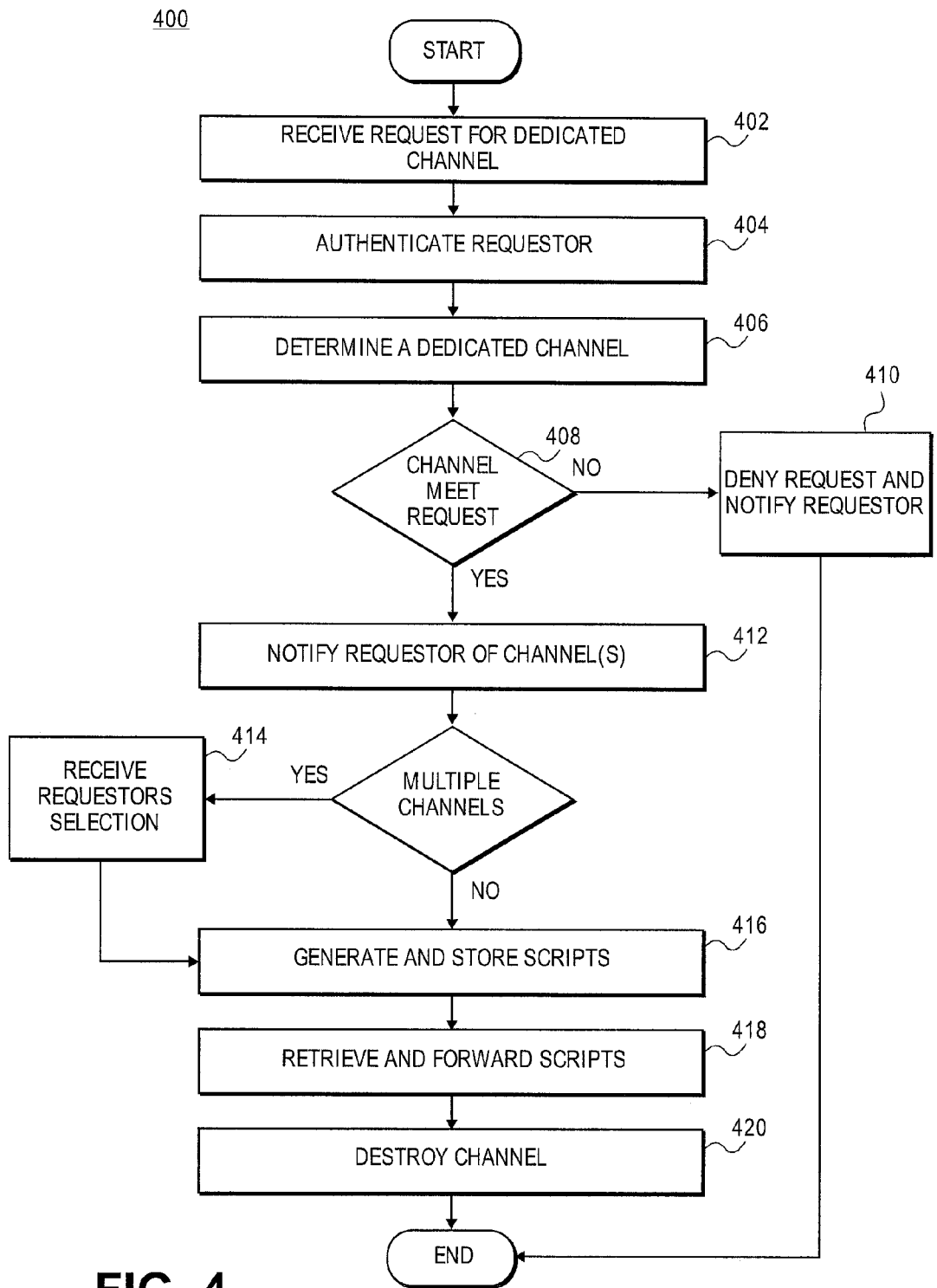
FIG. 4 is a flow diagram illustrating a method for scheduling channels in a network consistent with embodiments of the present disclosure.

Control server 112 controls the scheduling, determination, creation, and management of dedicated channels in network 100. FIG. 4 is a flow diagram illustrating a method 400 for receiving requests for dedicated channels and determining a dedicated channel based on the requests.

Method 400 begins with control server 112 receiving a request for a dedicated channel (stage 402). For example, a requester, such as a client or server in the sub-networks, may access an interface hosted by server front end 202. In the interface, the requestor may enter the information regarding the requested dedicated channel.

The request may include all necessary information in order to determine and establish the channel. For example, the request may include the identity of the requester and the requirements of the dedicated channel. The identity information may include a login name and password. The requirements of the dedicated channel may include requested bandwidth, the source and destination of the channel, the start and end time of the dedicated channel, and the duration of the dedicated channel.

Then, control server 112 authenticates the requester based on the identity information in the request supplied by the requestor (stage 404). For example, control server 112 may authenticate the requester by retrieving stored identity information for the requestor and comparing the information with the supplied identity information. If the information does not match, the request may be denied by control server 112.

Next, control server 112 determines a dedicated channel based on the requirement information supplied by the requester (stage 406). According to embodiments of the present disclosure, in order to determine a channel, bandwidth scheduler 208 may utilize various scheduling methods to determine a path across the network. For example, a dedicated channel from a given source (the location of the requestor) to a given destination (the destination of the data) may be based on: (i) a specified bandwidth in a specified time slot, (ii) highest available bandwidth in a specified time slot, (iii) earliest available time with a specified bandwidth and duration, and (iv) all available time slots with a specified bandwidth and duration.

The particular method utilized may depend on the type of dedicated channel requested, whether on-demand or in advance, and the requirements of the channel. Below are described several methods for determining the dedicated channel: fixed slot, largest bandwidth in a slot, first slot, first slot and all available slots, and all available slot for all pairs. According to embodiments, bandwidth scheduler 208 may utilize one or more of the methods depending on the type of request.

In the scheduling methods, network 100 may be represented as a graph G=(V,E) where each node or vertex represents a device in network 100, such as a switch for layers 1-2 and router for layer 3, and each edge represents a link such as in network 100. For each edge e∈E, there exists a list of bandwidth reservations specified as a piecewise constant function of time. In terms of data structure, G is represented using the cost-array-adjacency-list representation, and each edge has a list, the TB list, of time-bandwidth pairs associated with it. Let $(t_1, b_1), \ldots, (t_k, b_k)$ be the TB list associated with edge (u, v). The time-bandwidth pairs $(t_i, b_i)$ are in ascending order of $t_i$. The pair $(t_i, b_i)$ is interpreted to mean that edge (u, v) has bandwidth $b_i$ available from time $t_i$ to time $t_i+1 (t_{k+1}=\infty)$.

Fixed Slot

If the requester requests a dedicated channel for a fixed bandwidth for a fixed duration for a specified period of time, bandwidth scheduler 208 may utilize a fixed slot scheduling method to determine and allocate a path. In fixed slot, bandwidth scheduler defines a path from a source vertex, s, to a destination vertex, d. The path can have an available bandwidth of at least, b, from a pre-specified start time, $t_{start}$, to the time $t_{end}$. Such a path may be called a feasible path.

Figure 5:
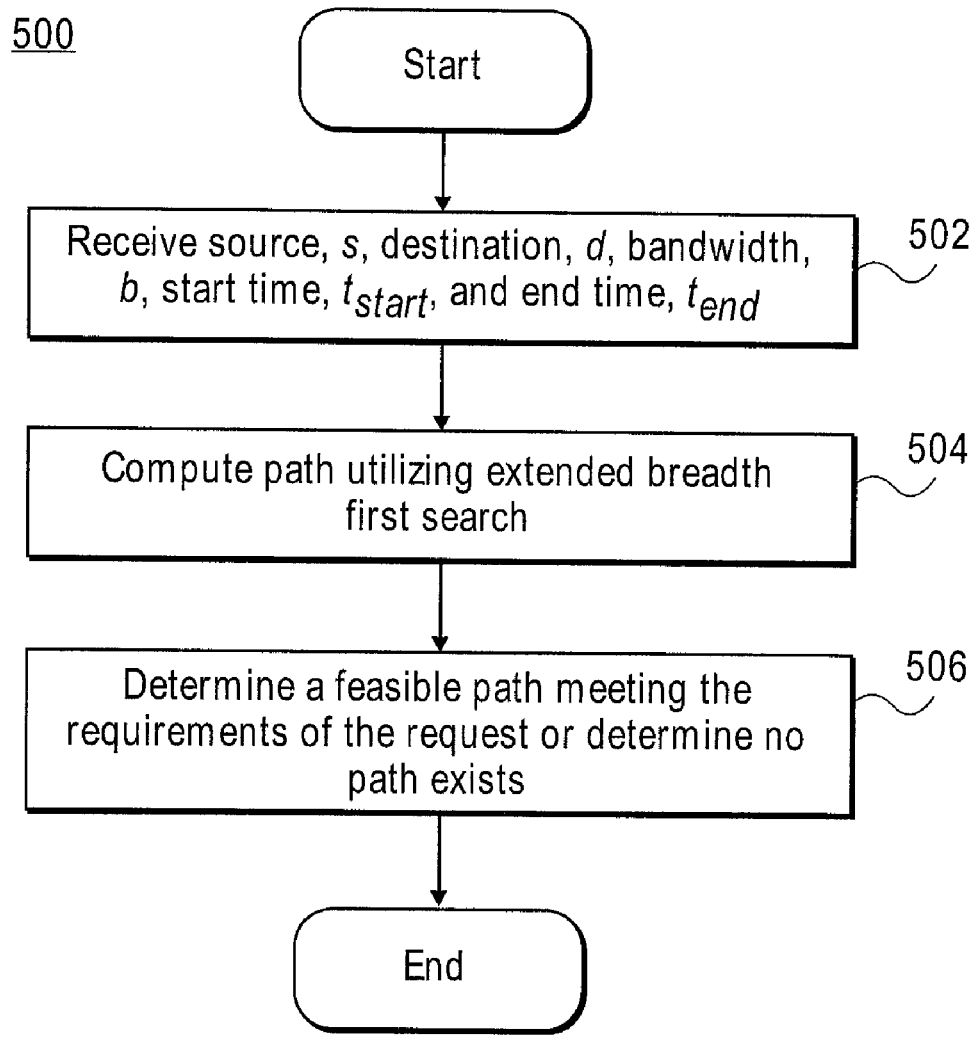
FIGS. 5-9 are flow diagrams illustrating methods for determining paths in a network consistent with embodiments of the present disclosure.

According to embodiments of the present disclosure, the fixed slot method is accomplished utilizing an extend breadth-first search because a breadth-first search finds a path from s to d with the fewest number of hops. FIG. 5 is a flow diagram illustrating the fixed slot method 500 consistent with embodiments of the present disclosure. Method 500 begins with bandwidth scheduler 208 receiving source, s, and destination, d, and bandwidth, b, start time, $t_{start}$, and end time, $t_{end}$ (stage 502).

Next, bandwidth scheduler 208 computes a path utilizing an extended breadth-first search (stage 504). The extended breadth-first search begins at vertex, s, and terminates either when vertex, d, is reached via a feasible path or when it is determined that there is no feasible path to d. In case a feasible path exists, the reverse of the sequence d, prev(d), prev(prev(d)), . . . , s is one such path.

If a computed path exists, bandwidth scheduler 208 determines the path to be a feasible path (stage 506). If no path is found, bandwidth scheduler 208 determines that no feasible path exists.

In accordance with embodiments of the present disclosure, below is an example of pseudocode for the extended breadth-first algorithm:

```
ExtendedBreadthFirstSearch(s, d, prev)
{
    Label vertex s as reached.
    Initialize Q to be a queue with only s in it.
    while (Q is not empty)
    {
```

-continued

```
    Delete a vertex w from the queue.
    Let u be a vertex (if any) adjacent from w.
    while (u ≠ null)
    {
        if (u has not been labeled and edge (w, u) has bandwidth
        b or more available from time t_start to t_end)
        {
            prev[u] = w;
            if (u == d) return;
            Label u as reached.
            Add u to the queue.
        }
        u = next vertex that is adjacent from w.
    }
  }
}
```

The extended breadth-first search begins at vertex, s, and terminates either when vertex, d, is reached via a feasible path or when it is determined that there is no feasible path to d. In case a feasible path exists, the reverse of the sequence d, prev(d), prev(prev(d)), . . . , s is one such path. The complexity of the extended breadth first search algorithm is O(n+L), where n is the number of vertices in the network and L is the sum of the lengths of the TB lists.

Largest Bandwidth in a Slot

If the requester requests a dedicated channel with the maximum available bandwidth for a given duration and given period of time, bandwidth scheduler 208 may utilize a largest bandwidth in a slot method to determine a path.

Figure 6:
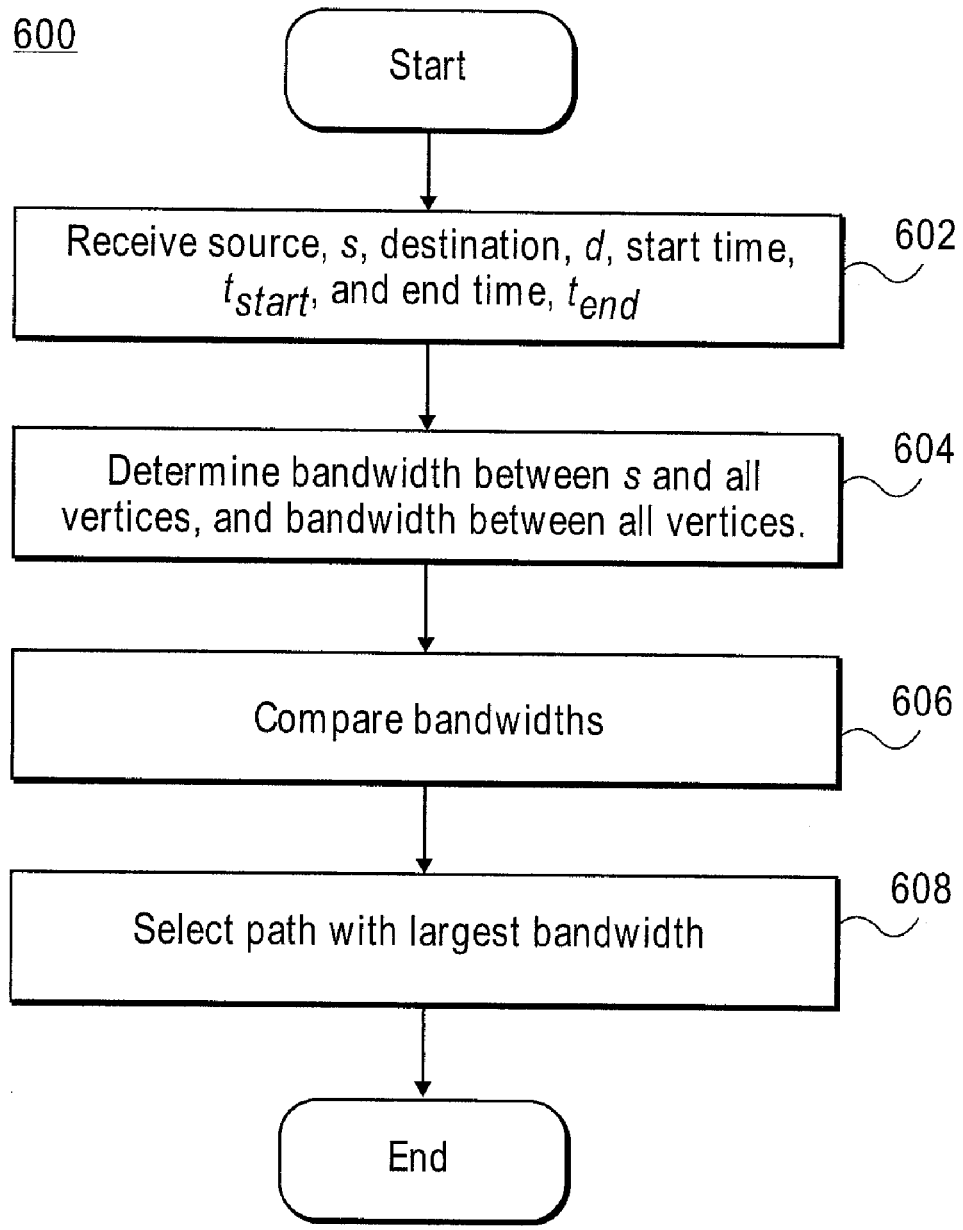

FIG. 6 is a flow diagram illustrating a largest bandwidth in a slot method 600 consistent with embodiments of the present disclosure. Method 600 begins with bandwidth scheduler 208 receiving source, s, and destination, d, start time, $t_{start}$, and end time, $t_{end}$ (stage 602).

Next, bandwidth scheduler 208 determines bandwidth between s and all vertices, and bandwidth between all vertices (stage 604). Additionally, bandwidth scheduler 208 compares the determined bandwidths (stage 606). Bandwidth scheduler 208 may utilize a modified Dijkstra's shortest path algorithm to determine and compare the bandwidths. Based on the comparison, bandwidth scheduler 208 selects the path with the largest bandwidth (stage 608).

According to embodiments of the present disclosure, an example of the algorithm may be:

```
Max Bandwidth(s,d,prev)
{
    bw[l] = b[s][l], 1 ≤ i ≤ n.
    prev[l] = s, 1 ≤ i ≤ n.
    prev[s] = o.
    Initialize L to be a list with all vertices other than s.
    for (i = 1, i < n –1, i + +)
    {
        Delete a vertex w from L with maximum bw.
        if (w == d) return.
        for (each u adjacent from w)
            if (bw[u] < min{bw[w], b[w][u]})
            {
                bw[u] = min{bw[w], b[w][u]}.
                prev[u] = w.
            }
    }
}
```

Here, b[u][v] is the minimum bandwidth available on the edge (u, v) during the specified interval/slot and bw[u] is the maximum bandwidth along paths from the source s to vertex u under the constraint that these paths go through only those vertices to which a maximum bandwidth path has already been found. The complexity of the algorithm is $O(n^2)$ for a general n vertex graph. However, practical network graphs have O(n) edges and the complexity becomes O(n log n) when a max heap (for example) is used to maintain the bw values.

First Slot

Figure 7:
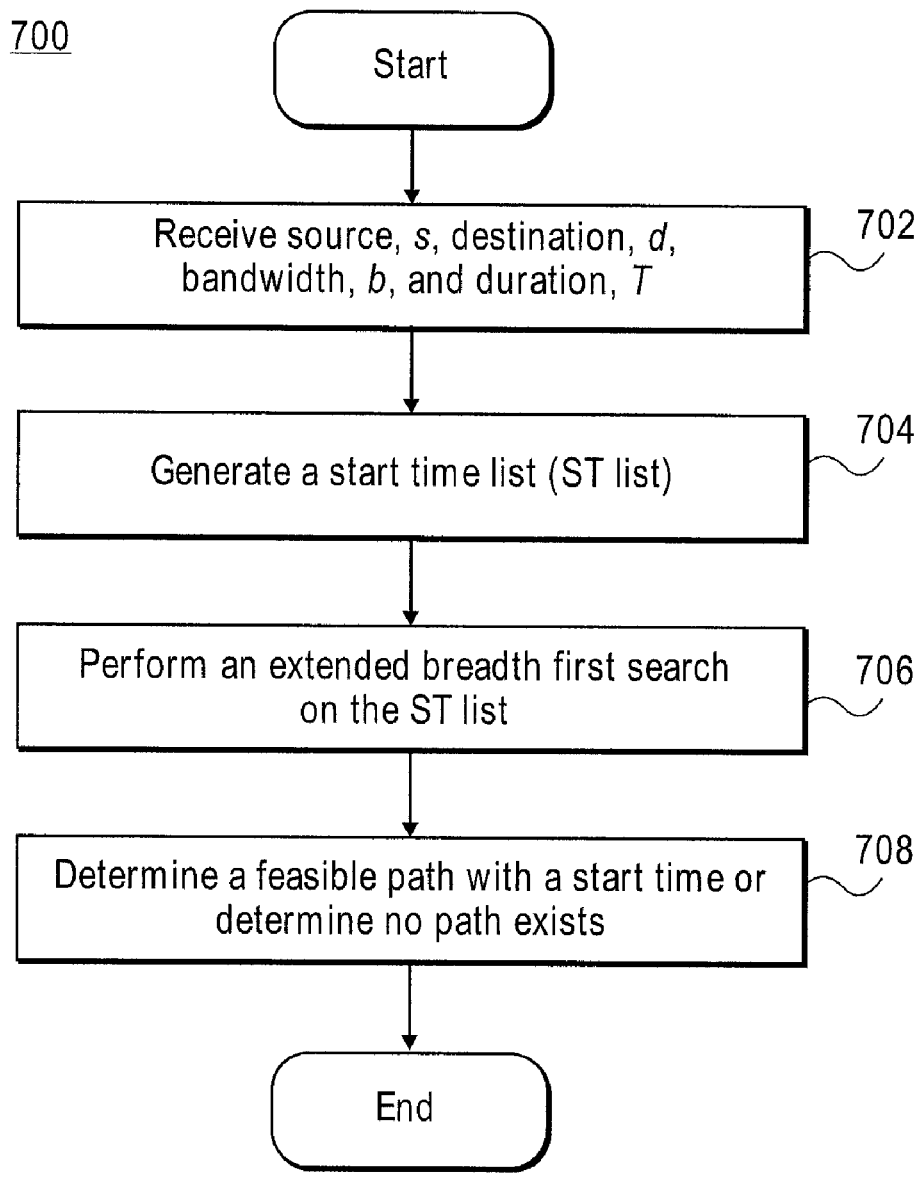

If the requester requests the first available path with a particular bandwidth for a particular bandwidth, bandwidth scheduler 208 may utilize a first slot method. FIG. 7 is a flow chart illustrating the first slot method 700 consistent with embodiments of the present disclosure. Method 700 begins with bandwidth scheduler 208 receiving source, s, and destination, d, and bandwidth, b, and duration T (stage 702).

Then, bandwidth scheduler 208 generates a start time list (stage 704). For each edge (u, v) of the graph, an ST (start time) list, ST(u, v), comprises pairs of the form(a, b), a≦b. The pair (a, b) has the interpretation: for every start time x∈[a, b], edge (u, v) has an available bandwidth of at least b from time x to time x+T. Bandwidth scheduler 208 may generate the ST list such that pairs on an ST list are disjoint and in ascending order. Bandwidth scheduler 208 may generate the ST lists may be constructed from the network resource information (e.g. TB lists) stored in database 212. Let $a_1 < a_2 < \ldots < a_q$ be the distinct a values in the (a, b) pairs in all ST lists.

In such a case, the start time for the first slot with bandwidth b and duration T (if such a slot exists) must be one of these $a_i$s. The first slot may be found by determining the smallest $a_i$ for which there is an s to d path such that $a_i$ is in an (a, b) interval of every edge on the path.

Then, bandwidth scheduler 208 performs a breadth first search on the ST list (stage 706). Bandwidth scheduler 208 may perform a search such as the extended breadth first search described for the Fixed Slot method. The search uses only those edges that include $a_i$ in one of their (a, b) intervals. From the search, bandwidth scheduler 208 determines a feasible path with a start time or determines no path exists (stage 708).

According to embodiments of the present disclosure, exemplary pseudo code for the first slot algorithm may be:

```
First Slot(s,d,prev)
{
    for (i = 1, i ≤ q, i++)
        if (NewBFS(s, d, a_i, prev)) return a_i;
    return –1;
}
```

In this algorithm, for each edge (u, v) of the graph, an ST (start time) list, ST(u, v), comprises pairs of the form(a, b), a≦b. The pair (a, b) has the interpretation: for every start time x∈[a, b], edge (u, v) has an available bandwidth of at least b from time x to time x+T. The pairs on an ST list are assumed to be disjoint and in ascending order. The ST lists may be constructed from the TB lists in O(L) time. Let $a_1 < a_2 < \ldots < a_q$ be the distinct a values in the (a, b) pairs in all ST lists.

In such a case, the start time for the first slot with bandwidth b and duration t (if such a slot exists) must be one of these $a_i$s. The first slot may be found by determining the smallest $a_i$ for which there is an s to d path such that $a_i$s is in an (a, b) interval of every edge on the path.

In the exemplary algorithm, NewBFS( ) does a breadth-first search beginning at s. The search uses only those edges that include $a_i$ in one of their (a, b) intervals. The search returns true if a path from s to d is found. The array prev has the same significance as in the extended breadth-first search algorithm for the fixed slot method.

Since the $a_i$s are tried in ascending order and the (a, b) pairs in the ST lists are also in ascending order, it is possible to implement NewBFS( ) so that the total running time of FirstSlot is O(eq), where e is the number of edges in the graph. Since e=O(n) for real-world networks, the complexity is O(nq). The actual s to d path for the first slot may be constructed in O(n) additional time using the prev values as described for the fixed slot algorithm.

First Slot and All-Available Slots

In addition to the first path available at a particular bandwidth, a requestor may desire to view all paths with the available bandwidth for a particular duration. Bandwidth scheduler may utilize a First Slot and All-available Slots scheduling method.

Figure 8:
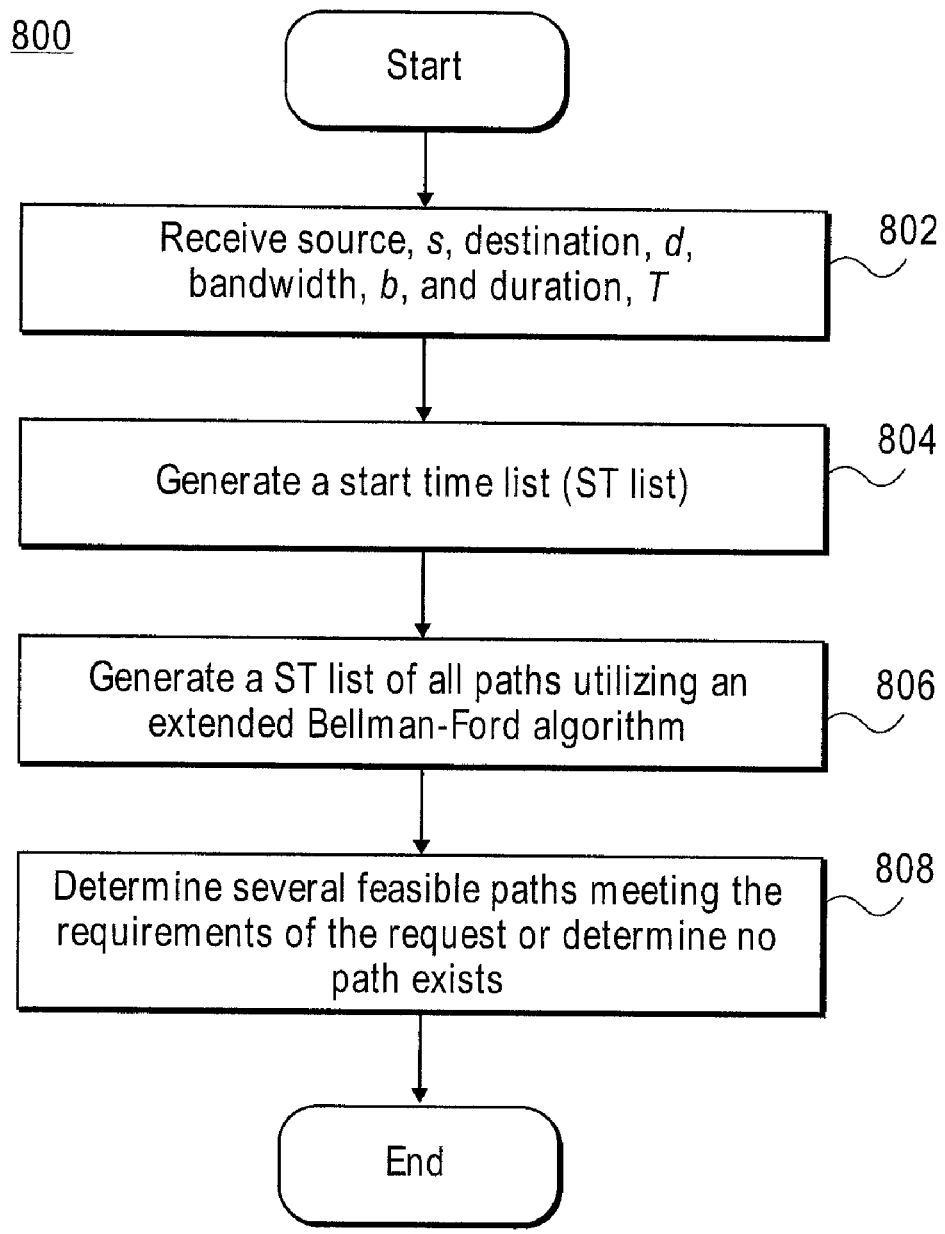

FIG. 8 is a diagram illustrating a First Slot and All-available Slots method 800 consistent with embodiments of the present disclosure. Method 800 begins with bandwidth scheduler 208 receiving source, s, and destination, d, and bandwidth, b, and duration T (stage 802).

Then, bandwidth scheduler 208 generates a start time list ("ST list") (stage 804). Next, bandwidth scheduler 208 generates a start time list for all paths (stage 806). The concept of an ST list for an edge may be extended to that of an ST list for a path. Let st(k, u) be the union of the ST lists for all paths from vertex s to vertex u that have at most k edges on them. As such, st(0, u)=ø for u≠s and st(0, s)=[0,∞]. Also, st(1, u)=ST (s, u) for u≠s and st(1,s)=st(0,s). For k>1 (actually also for k=1), the following recurrence appears st(k, u)=st(k−1, u)U{$U_v$ such that (v, u) is an edge {st(k−1, v)∩ST(v, u)}} where U and ∩ are list union and intersection operations. For an n-vertex graph, st(n−1, d) gives the start times of all feasible paths from s to d. Bandwidth scheduler 208 may determine the extended ST list by employing an extension of the Bellman-Ford algorithm to compute st(n−1, d). This extension allows a determination of all available slots from s to d and provides an alternative algorithm for the first slot method as the earliest start time for a bandwidth, b, and duration, t, path from s to d is the a value of the first (a, b) pair in st(n−1, d).

The computation of the st(*, *)s may be done in place (i.e., st(k, u) overwriting st(k−1, u)) and the computation of the sts terminated when st(k−1, u)=st(k, u) for all u. As such, bandwidth scheduler 208 may utilize an extended Bellman-Ford algorithm to compute st(n−1, *).

From the computation, bandwidth scheduler 208 determines several feasible paths meeting the requirements of the request or determines no path exists (stage 808).

According to embodiments of the present disclosure, exemplary pseudocode for the algorithm may be:

```
Extended Bellman-Ford(s,d)
{
    initialize st(*) = st(0, *);
    // compute st(*) = st(n −1, *) put the source vertex into list1;
    for (int k = 1; k < n; k++)
    {
        // see if there are vertices whose st value has changed
        if (list 1 is empty)
        break; // no such vertex
        while (list 1 is not empty)
        {
            delete a vertex v from list 1;
            for (each edge (v, u))
            {
                st(u) = st(u) U {st(v) ∩ ST(v, u);
                if (st(u) has changed and u is not on list 2)
```

```
                add u to list 2;
            }
            list 1 = list 2;
            make list 2 empty;
        }
    }
}
```

Each iteration of the for loop takes O(l) time, where l is the length of the longest st list. Since this for loop is iterated a total of O(ne) times, the complexity of the extended Bellman-Ford algorithm is O(nel). For real-world networks with e=O (n), this complexity is O($n^2$l). The described extended Bellman-Ford algorithm is an early-terminating variant of the Bellman-Ford algorithm.

When using the extended Bellman-Ford algorithm to solve the first slot problem, first find the earliest start time t for a feasible path using Extended Bellman-Ford. Then, the actual path may be computed using the function for fixed slot with $t_{start}$=t and $t_{end}$=t+T. In practice, the first slot method of may be expected to be faster by expecting q<nl practice.

All-Available Slots for All-Pairs

When a requestor desires to view all paths with the available bandwidth, the requestor may also desire to see all available paths, including different vertices, that meet the bandwidth and duration requirements. Bandwidth scheduler 208 may utilize an All-available Slots for all Pairs method to achieve this.

Figure 9:
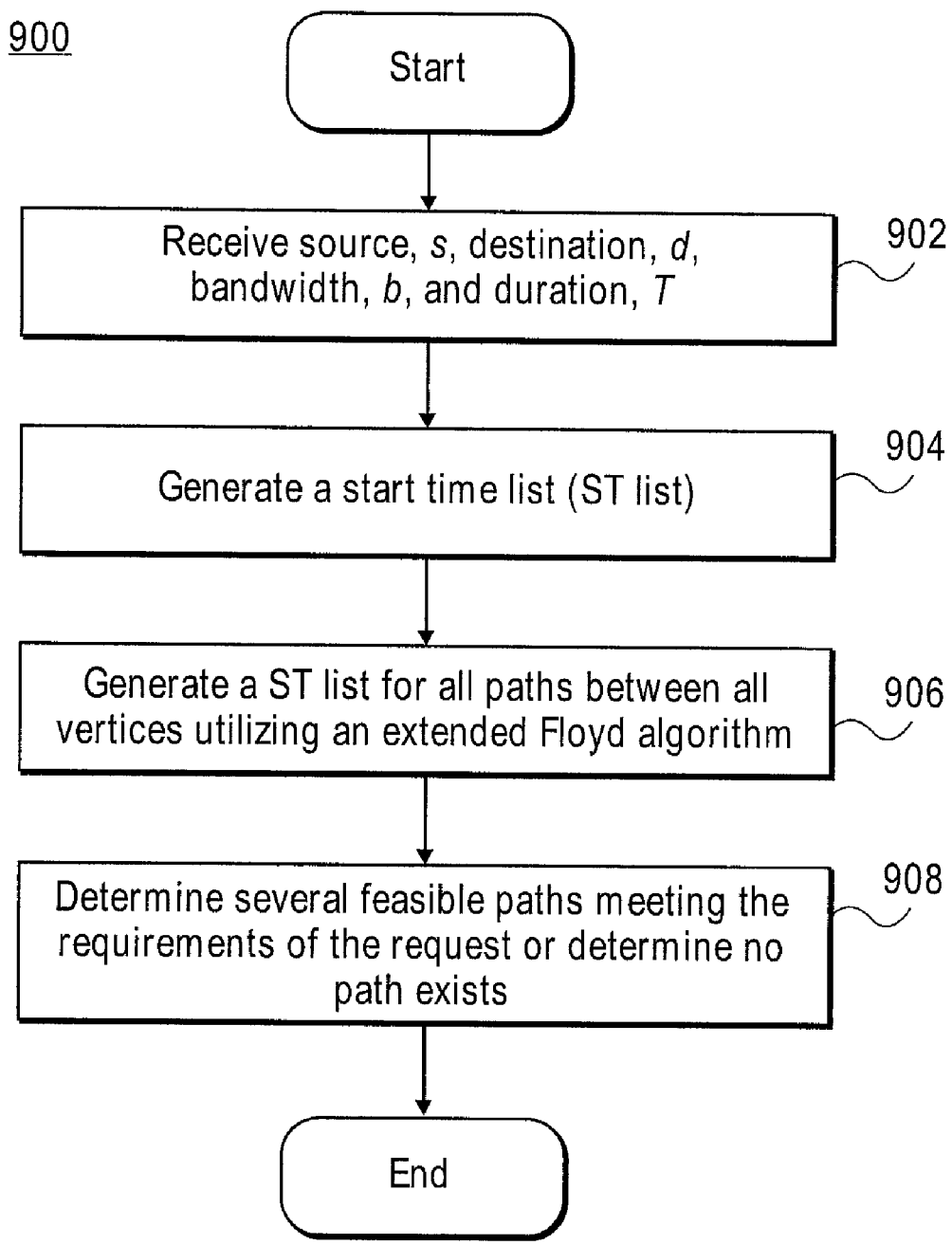

FIG. 9 is a diagram illustrating an All-available Slots for All Pairs method 900 consistent with embodiments of the present disclosure. Method 900 begins with bandwidth scheduler 208 receiving source, s, and destination, d, and bandwidth, b, and duration T (stage 902).

Then, bandwidth scheduler 208 generates a start time list ("ST list") (stage 904). Next, bandwidth scheduler 208 generates a start time list for all paths between all vertices (stage 906). The extended Bellman-Ford algorithm of the fixed slot and all-available slots computes st(u)=st(n−1, u) for a given source vertex s and all u in O(nel) time. st(u) gives the start time of all available slots of duration d and bandwidth b. So, in O(nel), using extended Bellman-Ford algorithm, all available slots from s to every other vertex u (including vertex d) can be determined.

To determine all available paths between all pairs of vertices, bandwidth scheduler 208 may run the extended Bellman-Ford algorithm n times, once with each vertex as the source vertex s. So, the time needed to determine all slots between all pairs of vertices is O($n^2$el). As alternative strategy to determine all available slots between all pairs of vertices, bandwidth scheduler may utilize an extension of Floyd's all-pairs shortest path algorithm.

From the computation, bandwidth scheduler 208 determines several feasible paths for all vertices meeting the requirements of the request or determines no path exists (stage 908). As such, the requester may choose to utilize a different source to establish the channel.

According to embodiments of the present disclosure, exemplary pseudocode algorithm may be:

```
Extended Floyd( )
{
    for (int k = 1; k < n; k++)
        for (int i = 1; i < n; k++)
            for (int j = 1; j < n; k++)
```

-continued $$st(i, j) = st(i, j) \cup \{st(i, k) \cap st(k,j)\};$$
}

Here, st(u, v) is the ST list for paths from u to v. Initially, st(u, v)=ST(u, v). On termination, st(u, v) gives all possible start times for paths from u to v.

The complexity of the extended Floyd algorithm is $O(n^3Z)$, where Z is the length of the longest st list. Since the number of edges in a general graph is $O(n^2)$, the worst-case complexity of using the extended Bellman-Ford algorithm to find all available slots between all pairs of vertices is more (by a factor of n, where n is the number of vertices) than using the extended Floyd algorithm. However, for network 100, the number of edges in a network is O(n) and both algorithms have the same asymptotic complexity. Since the extended Bellman-Ford algorithm has an early terminating feature, it is expected to perform better than the extended Floyd algorithm when there are short paths (i.e., a small number of edges relative to n−1) between pairs of vertices.

After the appropriate method is performed, bandwidth scheduler 208 determines if the computed path for establishing a channel meets the requirements of the request (stage 408). Bandwidth scheduler 208 may determine this by checking the results of one or more of the methods described above to determine if a path was found that meets the requirements of the request.

If the channel does not meet the requirements, bandwidth scheduler 208 denies the request and the requestor is notified (stage 410). If a channel does meet the requirements, bandwidth scheduler 208 notifies the requestor that a path for the channel has been found (stage 412). In the case that bandwidth scheduler 208 determines multiple channels (all slots methods), the bandwidth scheduler may notify the requestor of the multiple channels and allow the requester to select a channel (stage 414).

Then, bandwidth scheduler 208 generates the scripts to create the dedicated channel (stage 416). Bandwidth scheduler 208 then stores the scripts in database 212 (stage 416).

After the scripts have been stored in database 212, signaling daemon 210 may retrieve the scripts at the appropriate time and forward the scripts to the network components (stage 418). If the request is on-demand, signaling daemon 210 may immediately retrieve and forward the scripts. If the request is in-advance, signaling daemon 210 may retrieve the scripts at the appropriate time and forward the scripts to the network components.

After the duration of the channel has passed, signaling daemon 212 may destroy or tear down the channel (stage 420). Signaling daemon 212 may destroy the channel by retrieving and forwarding the scripts to remove the channel from network 100.

Network 100 including control server 112 and method 400 may be utilized in any setting in which large amounts of data need to be transmitted between dispersed geographic locations. For example, network 100 may be a network which interconnects various universities and scientific laboratories.

In such a setting, sub-network 104 may be located on the campus of a university. Researchers may be conducting experiments using clients 120 with server 118 providing the network support for the sub-network. During the course of experiments, the researches may wish to share data with other institutions or utilize the computing resources of another institution.

For example, sub-network 108 may be located at a national or international laboratory. Researchers may share data with the laboratory by requesting a dedicated channel in network 100 for control server 112. Since the channel will be guaranteed a large bandwidth for fixed durations, the researchers may efficiently share data with the laboratory or utilize the computing resources of the laboratory.

One skilled in the art will realize that network 100 and control server 112 are exemplary. The methods for establishing and controlling dedicated channels, such as method 400, 500, 600, 700, 800, and 900, may be performed on any network structure by any suitable control system. For example, the methods may be performed by any network structure and at any level of an OSI network architecture.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling access to a network, comprising:
   an interface configured to receive a request to establish a dedicated channel in a network, the request comprising a source endpoint and a destination endpoint, and a start time for the channel or a duration for the channel;
   a bandwidth scheduler coupled to the interface and configured to determine a feasible path for the dedicated channel across the network based on the request and resources of the network; and
   a signaling daemon configured to generate a control signal based on the determined feasible path.

2. The system of claim 1, wherein the interface comprises a network interface configured to receive requests for the dedicated channel in the network and for sending the generated control signal to the network.

3. The system of claim 2, wherein the interface is further configured to authenticate the identity of an entity transmitting the request.

4. The system of claim 1, further comprising:
   a memory coupled to the bandwidth scheduler, signaling daemon, and interface configured to store the determined time continuous path and the control signals.

5. The system of claim 1, wherein the bandwidth scheduler is configured to:
   determine a maximum bandwidth available for the channel having the requested endpoints at the requested start time for the requested duration in the network; and
   select a feasible unique time continuous path with the maximum bandwidth as the path of the channel.

6. The system of claim 1, wherein the bandwidth scheduler is configured to:
   generate an earliest start time for an available channel with a bandwidth for the requested duration;
   perform an extended breadth first search to determine at least one feasible path between the requested endpoints with the requested bandwidth for the requested duration beginning at the generated earliest start time; and
   select the at least one feasible path as the path of the channel.

7. The system of claim 1, wherein the bandwidth scheduler is configured to:
   generate, using an extended Bellman-Ford algorithm, a list of start times of available paths between the requested endpoints for the channel in the network with a bandwidth for the requested duration;
   and perform an extended breadth first search to determine at least one feasible path between the requested end points with the bandwidth for the requested duration beginning at a user selected start time from the generated list of start times; and select the at least one feasible unique time continuous path as the path of the channel.

8. The system of claim 1, wherein the bandwidth scheduler is configured to:

generate using an extended Floyd algorithm, a list of start times of paths between all locations in the network with a bandwidth for the requested duration and generate at least one feasible path between a set of user selected endpoints and a user selected generated start time with the bandwidth for the desired duration; and select the at least one feasible path as the path of the channel.

9. The system of claim 1, wherein the system comprises at least one computer including at least one interface, at least one bandwidth scheduler, and at least one signaling daemon.

10. The system of claim 1, wherein the system comprises multiple computers, each computer including at least one bandwidth scheduler configured to cooperatively control access to the network.

11. A method for transferring data, comprising:

receiving a request to establish a dedicated channel in a network, the request comprising a source endpoint and a start time for the channel or a duration of the channel;

determining a feasible path for the dedicated channel across the network based on the request and resources of the network by a processor; and scheduling the channel based on the determination.

12. The method of claim 11, wherein the request to establish the channel comprises a request for immediate establishment of the channel across the network.

13. The method of claim 11, wherein the request to establish the channel comprises a request for establishment of the channel across the network at a later time.

14. The method of claim 11, wherein scheduling the channel comprises:

storing information about the determined feasible path and channel; and transmitting information about the determined feasible path and channel to components of the network.

15. The method of claim 11, wherein receiving the request includes receiving authenticated information about an entity requesting the channel.

16. The method of claim 11, further comprising:

determining a maximum bandwidth available for the channel having the requested endpoints; and selecting at least one feasible path with the maximum bandwidth as the path of the channel.

17. The method of claim 11, further comprising:

generating the earliest start time at which a channel with the user provided end points and the requested duration;

performing an extended breadth first search to determine at least one feasible path between the end points of the requested channel and having a bandwidth for the requested duration beginning at the generated earliest start time; and selecting the at least one feasible path as the path of the channel.

18. The method of claim 11, further comprising:

generating, using an extended Bellman-Ford algorithm, a list of start times of available paths between the requested endpoints for the channel in the network with a bandwidth for the requested duration;

performing an extended breadth first search to determine at least one feasible path between the requested end points with the bandwidth for the requested duration; and selecting the at least one feasible path as the path of the channel.

19. The method of claim 11, further comprising:

generating, using an extended Floyd algorithm, a list of start times of paths between all locations in the network with a bandwidth for the requested duration;

generating at least one feasible path between a set of user selected endpoints and a user selected generated start time with the bandwidth for the requested duration; and selecting the at least one feasible unique time continuous paths as the path of the channel.

20. A non-transitory computer readable storage medium encoded thereon computer-readable instructions when executed causing a processor to perform the method of claim 11.

21. A computer, comprising:

a processor;

an interface coupled to the processor configured to receive a request to establish a dedicated channel in a network, the request comprising a source endpoint and a destination endpoint, and a start time for the channel or a duration of the channel; and a memory coupled to the processor and interface, the memory containing instructions for causing the processor to determine a feasible path of the dedicated channel across the network based on the request and resources of the network, and to schedule the channel based on the determination.

* * * * *